(12) United States Patent
Løseth et al.

(10) Patent No.: US 9,715,028 B2
(45) Date of Patent: Jul. 25, 2017

(54) METHOD OF ASSESSING HYDROCARBON SOURCE ROCK CANDIDATE

(71) Applicant: STATOIL PETROLEUM AS, Stavanger (NO)

(72) Inventors: Helge Løseth, Trondheim (NO); Lars Wensaas, Trondheim (NO); Marita Gading, Trondheim (NO); Kenneth Duffaut, Trondheim (NO); Heinz Michael Springer, Sandnes (NO)

(73) Assignee: STATOIL PETROLEUM AS, Stavanger (NO)

( * ) Notice: Subject to any disclaimer, the term of this patent is extended or adjusted under 35 U.S.C. 154(b) by 0 days.

(21) Appl. No.: 14/953,142

(22) Filed: Nov. 27, 2015

(65) Prior Publication Data

US 2016/0077229 A1    Mar. 17, 2016

Related U.S. Application Data

(63) Continuation of application No. 13/394,369, filed as application No. PCT/EP2010/063125 on Sep. 7, 2010, now Pat. No. 9,244,182.

(30) Foreign Application Priority Data

Sep. 7, 2009 (GB) .................................. 0915510.2

(51) Int. Cl.
 *G01V 1/30* (2006.01)
(52) U.S. Cl.
 CPC .............. *G01V 1/307* (2013.01); *G01V 1/30* (2013.01); *G01V 2210/632* (2013.01)
(58) Field of Classification Search
 CPC ....................................................... G01V 1/30

USPC ............................................................ 702/11
See application file for complete search history.

(56) References Cited

U.S. PATENT DOCUMENTS

| 4,686,364 A | 8/1987 | Herron |
| 5,784,334 A * | 7/1998 | Sena ...................... G01V 1/301 367/38 |
| 6,058,074 A | 5/2000 | Swan et al. |
| 2003/0004648 A1 | 1/2003 | Huffman et al. |

(Continued)

FOREIGN PATENT DOCUMENTS

WO    WO 97/41456 A1    11/1997

OTHER PUBLICATIONS

Carcione, "AVO effects of a hydrocarbon source-rock layer," Geophysics, Mar.-Apr. 2001, vol. 66, No. 2, pp. 419-427.

(Continued)

*Primary Examiner* — Bryan Bui
(74) *Attorney, Agent, or Firm* — Birch, Stewart, Kolasch & Birch, LLP

(57) ABSTRACT

A method of assessing a hydrocarbon source rock candidate uses seismic data for a region of the Earth. The data are analyzed to determine the presence, thickness and lateral extent of candidate source rock based on the knowledge of the seismic behavior of hydrocarbon source rocks. An estimate is provided of the organic content of the candidate source rock from acoustic impedance. An estimate of the hydrocarbon generation potential of the candidate source rock is then provided from the thickness and lateral extent of the candidate source rock and from the estimate of the organic content.

12 Claims, 5 Drawing Sheets

(56) References Cited

U.S. PATENT DOCUMENTS

2007/0183260 A1  8/2007  Lee et al.
2011/0051553 A1  3/2011  Scott et al.

OTHER PUBLICATIONS

Castagna et al., "Framework for AVO gradient and intercept interpretation," Geophysics, May-Jun. 1998, vol. 63, No. 3, pp. 948-956.
International Search Report issued in PCT/EP2010/063125, dated Feb. 10, 2011.
Rutherford et al., "Amplitude-versus-offset variations in gas sands," Geophysics, Jun. 1989, vol. 54, No. 6, pp. 680-688.

* cited by examiner

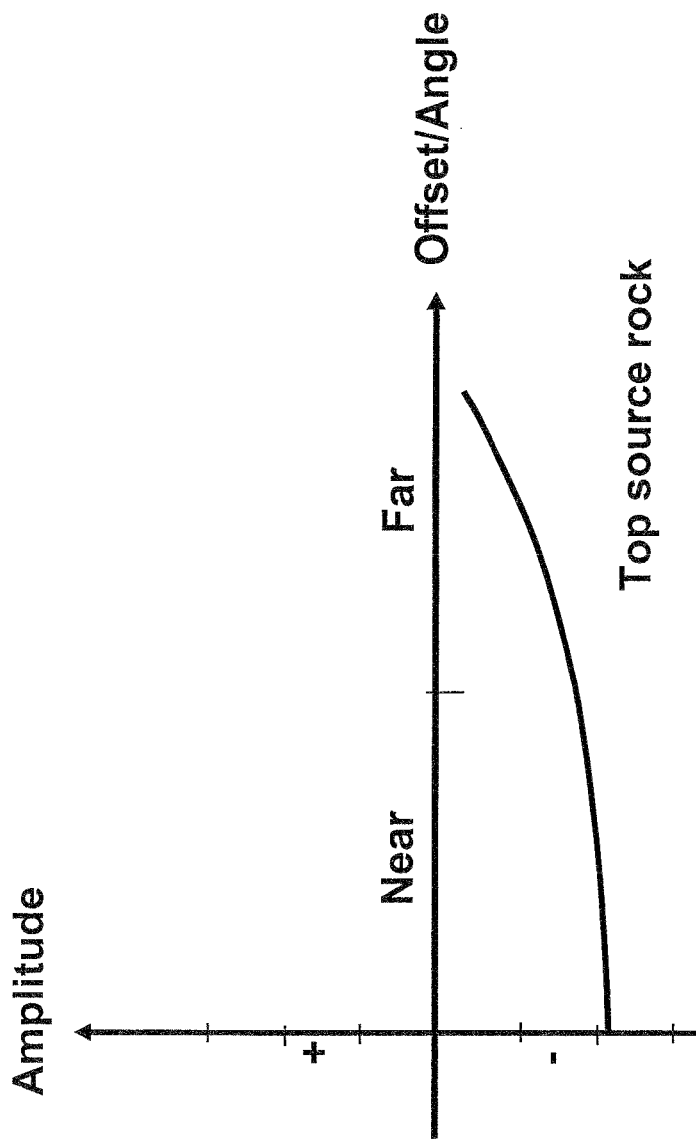

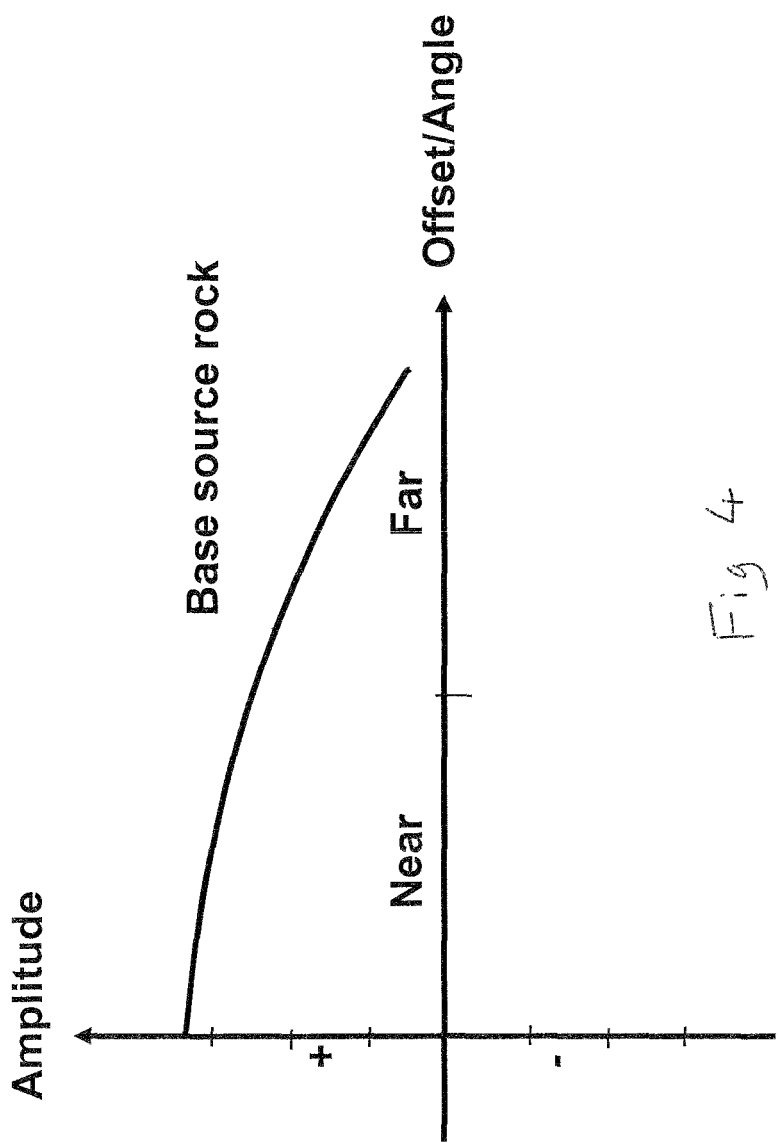

METHOD OF ASSESSING HYDROCARBON SOURCE ROCK CANDIDATE

CROSS-REFERENCE TO RELATED APPLICATIONS

This application is a Continuation of U.S. patent application Ser. No. 13/394,369 filed on Mar. 22, 2012, which is the national stage entry of international application PCT/EP2010/063125 filed on Sep. 7, 2010, which in turn claims priority to United Kingdom application 0915510.2 filed on Sep. 7, 2009.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

STATEMENT REGARDING PRIOR DISCLOSURES BY THE INVENTOR OR A JOINT INVENTOR

Not Applicable.

BACKGROUND OF THE INVENTION

The present invention relates to a method of assessing a hydrocarbon source rock candidate. Such a method may be used, for example, to assess the presence, extent, thickness and richness of candidate source rock so as to provide an estimate of its organic content and its potential for hydrocarbon generation.

BRIEF SUMMARY OF THE INVENTION

According to a first aspect of the invention, there is provided a method of assessing a hydrocarbon source rock candidate, comprising the steps of: providing seismic data for a region of the Earth; analysing the data to determine the presence, thickness and lateral extent of candidate source rock based on the seismic behaviour of hydrocarbon source rocks; providing an estimate of the organic content of the candidate source rock from acoustic impedance; and providing an estimate of the hydrocarbon generation potential of the candidate source rock from the thickness and lateral extent of the candidate source rock and from the estimate of the organic content.

The organic content may comprise an amount of hydrocarbon. In this context, the hydrocarbon would be trapped or contained in or held by the candidate source rock, and would be considered as part of the organic content of the candidate source rock. The step of providing an estimate of the hydrocarbon generation potential of the candidate source rock may comprise providing an estimate of the amount and/or distribution, or at least an indication of the presence, of hydrocarbon contained in or held by the candidate source rock.

The organic content may comprise an amount of natural gas. In this context, the natural gas would be trapped or contained in or held by the candidate source rock, and would be considered as part of the organic content of the candidate source rock. The step of providing an estimate of the hydrocarbon generation potential of the candidate source rock may comprise providing an estimate of the amount and/or distribution, or at least an indication of the presence, of natural gas contained in or held by the candidate source rock.

According to a second aspect of the invention, there is provided a method of assessing a hydrocarbon source rock candidate in relation to its hydrocarbon content. Seismic data for a region of the Earth are provided. The data are analysed to determine the presence, thickness, and lateral extent of candidate source rock based on the seismic behaviour of hydrocarbon source rocks. An estimate or analysis of the organic content of the candidate source rock is provided from acoustic impedance. The organic content in this context may comprise an amount of hydrocarbon. In this respect, the hydrocarbon is trapped or contained in or held by the candidate source rock, and is considered as part of the organic content of the candidate source rock. An estimate of the amount and/or distribution, or at least an indication of the presence, of hydrocarbon contained in or held by the candidate source rock is provided from the thickness and lateral extent of the candidate source rock and from the estimate or analysis of the organic content.

The hydrocarbon may be or comprise natural gas.

According to a third aspect of the invention, there is provided a method of assessing a hydrocarbon source rock candidate in relation to its natural gas content. Seismic data for a region of the Earth are provided. The data are analysed to determine the presence, thickness, and lateral extent of candidate source rock based on the seismic behaviour of hydrocarbon source rocks. An estimate or analysis of the organic content of the candidate source rock is provided from acoustic impedance. The organic content in this context may comprise an amount of natural gas. In this respect, the natural gas is trapped or contained in or held by the candidate source rock, and is considered as part of the organic content of the candidate source rock. An estimate of the amount and/or distribution, or at least an indication of the presence, of natural gas contained in or held by the candidate source rock is provided from the thickness and lateral extent of the candidate source rock and from the estimate or analysis of the organic content.

The candidate source rock may comprise a shale gas reservoir, and the hydrocarbon or natural gas referred to above may comprise shale gas.

The step of providing an estimate of the hydrocarbon generation potential may comprise providing an estimate of the hydrocarbon already generated, whether that hydrocarbon is still contained in or held by the source rock, or whether that hydrocarbon has been expelled from the source rock, or a combination of these.

The step of providing an estimate of the hydrocarbon generation potential may comprise providing an estimate of and/or quantifying the existing and/or potential hydrocarbon content of the candidate source rock.

The organic content estimate may be an estimate of organic content density.

According to a fourth aspect of the invention, there is provided method of identifying a source rock candidate, comprising the steps of: providing seismic data for a region of the Earth; analysing the data to determine the presence of a candidate source rock from an upper boundary having a fall in acoustic impedance greater than a first threshold value and having an Amplitude Versus Offset Class 4 response (for example as disclosed in Rutherford and Williams (1989) and Castagna et al (1998)), and/or from a lower boundary having a rise in acoustic impedance greater than a second threshold value and having an Amplitude Versus Offset Class 1 response (for example as disclosed in Rutherford and Williams (1989) and Castagna et al (1998)).

According to a fifth aspect of the invention, there is provided a method of identifying a source rock candidate, comprising the steps of: providing seismic data for a region of the Earth; analysing the data to determine the presence of a candidate source rock by locating a region of rock where the seismic data indicates a low acoustic impedance relative to an over- and/or underlying region of rock and where the seismic amplitude decreases with increasing offset.

The analysing step may comprise determining the presence of the candidate source rock from an upper boundary having a fall in acoustic impedance greater than a first threshold value. The analysing step may comprise determining the thickness of the candidate source rock from a lower boundary having a rise in acoustic impedance greater than a second threshold value. The organic content estimate may be derived from the acoustic impedance profile between the upper and lower boundaries and a predetermined relationship between acoustic impedance and organic content.

The analysing step may comprise determining the presence of the candidate source rock from an upper boundary having an Amplitude Versus Offset Class 4 response (for example as disclosed in Rutherford and Williams (1989) and Castagna et al (1998)). The method may comprise determining the presence of the candidate source rock from an upper boundary having an Amplitude Versus Offset Class 4 response with a wider extent than non-source rock exhibiting an Amplitude Versus Offset Class 4 response.

The analysing step may comprise determining the presence of the candidate source rock from a lower boundary having an Amplitude Versus Offset Class 1 response (for example as disclosed in Rutherford and Williams (1989) and Castagna et al (1998)).

The organic content estimate be derived from well-log data in or adjacent the region of interest.

The analysing step may comprise determining the presence of the candidate source rock by analysing the lateral extent of continuous boundaries having an expected seismic response.

The analysing step may comprise determining the presence of the candidate source rock on the basis of faults which detach near a lower boundary and which do not reach higher than substantially 100 meters above an upper boundary.

The method may comprise the further step of performing a basin modelling based on the seismic characteristics of the candidate source rock. The method may comprise a further step of ranging basins, plays and prospects on the basis of the basin model.

The method may comprise the further step of controlling exploration or production on the basis of the basin model. The step of controlling production may comprise selecting a location or area for drilling a well.

As mentioned above, according to the fifth aspect of the invention, there is provided a method of identifying a source rock candidate, comprising the steps of: providing seismic data for a region of the Earth; analysing the data to determine the presence of a candidate source rock by locating a region of rock where the seismic data indicates a low acoustic impedance relative to an over- and/or underlying region of rock and where the seismic amplitude decreases with increasing offset.

The analysing step may comprise locating a region with a reflection having an AVO Class 4 seismic response at the top.

The analysing step may comprise locating a region with a reflection having an AVO Class 1 seismic response at the base.

The source rock may be or may comprise a shale gas or an oil gas reservoir.

The analysing step may comprise locating a region having an AVO Class 4 response at the top over a relatively large area extending laterally.

The analysing step may comprise locating a region having an AVO Class 1 response at the base over a relatively large area extending laterally.

The method may comprise making an assessment of the lateral extent, thickness and richness of the candidate source rock.

The method may comprise providing an estimate of the amount and/or distribution, or at least an indication of the presence, of hydrocarbon contained in or held by the candidate source rock from acoustic impedance information derived from the seismic data. The hydrocarbon may be natural gas, such as shale gas.

The method may comprise providing an estimate of the amount and/or distribution, or at least an indication of the presence, of natural gas such as shale gas contained in or held by the candidate source rock from acoustic impedance information derived from the seismic data.

Further aspects of the present invention (computer program, computer-readable storage medium, computer and apparatus) are set out in the appended claims.

It is thus possible to provide predictions, based wholly or largely on seismic data, of the presence and organic content of source rock with greater confidence. This allows an explorationist to reduce the risk of source rock presence in basin, play and prospect risking.

BRIEF DESCRIPTION OF THE SEVERAL VIEWS OF THE DRAWING(S)

The present invention will be further described, by way of example, with reference to the accompanying drawings, in which:

FIGS. 3 and 4 are graphs illustrating amplitude against offset or angle for Amplitude Versus Offset (AVO) Class 4 and Class 1 responses, respectively.

DETAILED DESCRIPTION OF THE INVENTION

Figure 1B:
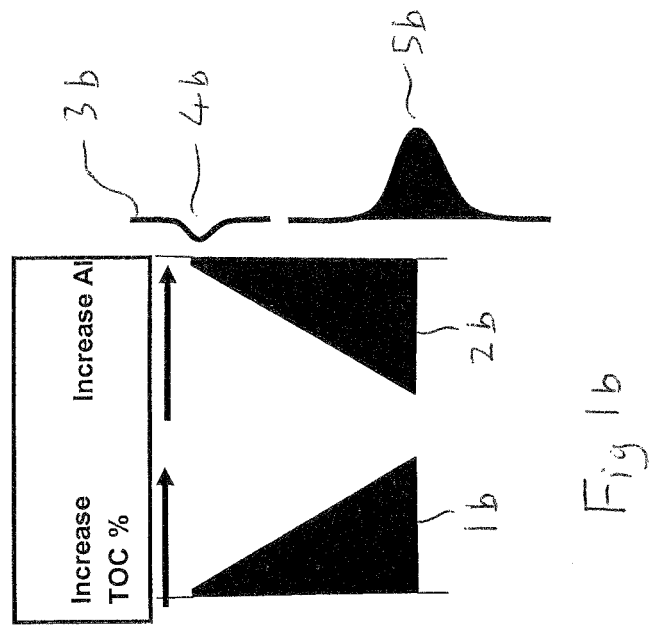
FIGS. 1a and 1b are graphs illustrating the relationship among total organic carbon content, acoustic impedance and seismic response.

As an initial stage in assessing a hydrocarbon source rock candidate, the available data and the time available for source rock study are assessed. Based on the geology of the region to be investigated, the expected stratigraphic level of the source rock is identified. It is necessary to have seismic data relating to the area but also desirable to have well logs, preferably from wells which penetrate the candidate source rock. The available data and the time available for assessment determine whether a full workflow strategy may be adopted or whether a fast-track workflow strategy is more appropriate. The full workflow will be described first.

As an initial step, the seismic data are interpreted so as to identify candidates for source rock. In particular, reflectors which may form source rock boundaries are identified from the seismic data. Well log data are similarly assessed and interpreted so as to identify corresponding reflectors in the well log data.

The seismic data used in this technique comprise seismic gathers or offset seismic data (see Sheriff and Geldart, 2006). Such data and techniques for obtaining them are well known but will be described briefly hereinafter for the sake of completeness.

Reflection seismology is a method of exploration geophysics that uses the principles of seismology to estimate the properties of the Earth's subsurface from reflected seismic waves. The method requires a controlled seismic source of energy. By noting the time it takes for a signal to arrive at a receiver, it is possible to estimate the depth of the feature that generated the reflection. In a typical seismic survey, a large number of receivers with varying distance from the source (known as "offset") are used to record the reflections.

When a seismic wave encounters a boundary between two materials with different physical properties, some of the energy in the wave will be reflected at the boundary, while some of the energy will continue through the boundary. The proportion of the energy reflected is a result of the property contrast at the boundary. The reflected energy will also vary with the angle at which the wave hits the interface. Reflections of different angles hit receivers located at different distances from the source.

A seismic gather is the collection of all the reflected signals generated from one location that have hit the receivers at different angles. Stacking is a process whereby the correctly time-aligned signals are added together so as to improve signal quality. All the signals hitting one location in the subsurface are stacked together to form a "full stack". Instead of using all signals, subsets representing different reflection angles can be stacked into "angle stacks" or "offset stacks". Signals reflected at small angles are recorded at small offsets and are stacked into a "near stack" volume. Similarly, a "far stack" volume is made from the large angle reflections. The amplitude of the reflection may vary with reflection angle and the change in amplitude (from near stack to far stack or along a seismic gather) is called "amplitude versus offset" (AVO) or "amplitude versus angle" (AVA). The nature of the AVO may be characteristic for certain rock types and fluids.

Free hydrocarbons are generated in organic rich rocks when the rock becomes heated during burial and the organic material starts to convert to hydrocarbons. Organic rich rocks which have produced or are able to produce hydrocarbons if they are heated sufficiently are termed "hydrocarbon source rocks" (or "source rocks" for short). The organic content of the rock (Total Organic Carbon content or TOC content) can be measured by geochemical screening analytical methods, for example using a carbon analyser (e.g. Leco) or a bulk-flow (Rock-Eval type) pyrolyser with oxidation unit (Weiss et al., 2000).

When a well is drilled into the sub-surface, it is customary to perform continuous recording of geophysical parameters along the borehole. These kinds of measurements are referred to as well logs (Rider, 1996). Different physical properties are recorded in a borehole and, in order to be able to use the logs as support for identification and interpretation of source rocks on seismic data, the database should as a minimum contain compressional velocity (p-wave) and bulk density logs from the source rock interval.

When well log data are available, they are used to generate synthetic gathers for well ties. For example, as mentioned hereinbefore, the well log data contain at least information about the seismic velocity and material density at different depths from the area/region of interest. This data may be used to simulate the seismic response by means of computer simulation and based on the velocity and density logs from the well. The resulting synthetic seismic gather simulates the expected seismic response at the boundaries between rocks having different properties.

Figure 1A:
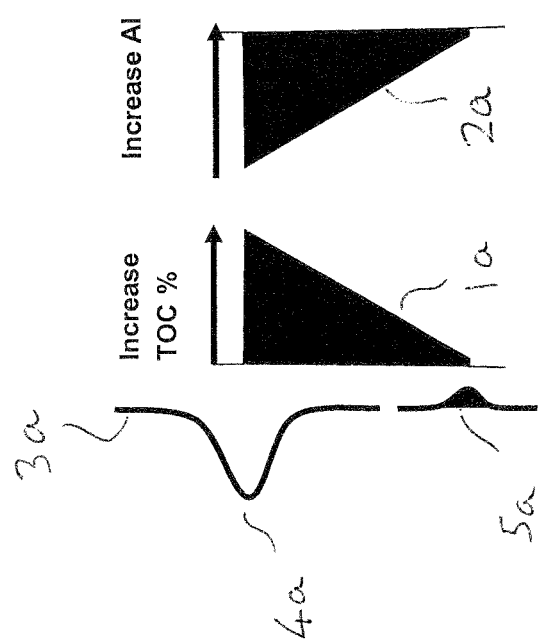

FIGS. 1a and 1b illustrate two typical seismic responses for different vertical distributions of organic material within a hydrocarbon source rock. The vertical distribution or "TOC profile" is illustrated as a percentage by weight at 1a and 1b in FIGS. 1a and 1b, respectively. The concentration increases monotonically from the bottom of the source rock to the top of the source rock in FIG. 1a. The acoustic impedance (AI) is higher for lower concentrations of organic material and, as shown at 2a in FIG. 1a, decreases monotonically from the bottom of the source rock layer to the top thereof. The seismic trace corresponding to such a layer is shown at 3a. The reduction in acoustic impedance at the top of the source rock interval causes a large reflection illustrated by the high negative amplitude of the seismic waveform at 4a in FIG. 1a. Conversely, the higher acoustic impedance at the bottom of the source rock differs relatively little from the acoustic impedance of the layer below the source rock and this gives rise to a much weaker reflection represented by the positive amplitude at 5a in FIG. 1c.

FIG. 1b illustrates the response where the vertical distribution of the organic material is the reverse of that shown in FIG. 1a such that the concentration increases from the top of the source rock layer to the bottom as shown at 1b. The acoustic impedance thus decreases from the top of the layer to the bottom as shown at 2b and this gives rise to a relatively small negative amplitude 4b in the seismic reflection waveform 3b corresponding to a weak reflection from the top of the source rock layer and a relatively large positive amplitude 5b corresponding to a strong reflection from the bottom of the layer. The TOC profile thus determines whether the seismic response from the top or bottom of the source rock is expected to be stronger and hence determines whether the top or the bottom response is best suited for identification of the source rock in seismic data.

If total organic carbon data is available, for example from analysis of the rock samples retrieved during drilling, the relationship between concentration of organic material and acoustic impedance can be obtained for different concentrations at different vertical positions within the source rock.

If TOC data are not available, then well logs may be analysed for trends in order to determine the vertical distribution of organic matter in the source rock material. The material densities and seismic velocities are typically lower in most organic rich parts of the source rock than in less organic rich parts and in surrounding rocks. Also, gamma logs, resistivity logs and porosity logs have characteristic responses in source rocks.

If well data are not available for the region being assessed, then TOC profile analysis may be performed on the basis of knowledge from publications, analogues or neighbouring areas to determine vertical distribution of organic content.

Figure 2:
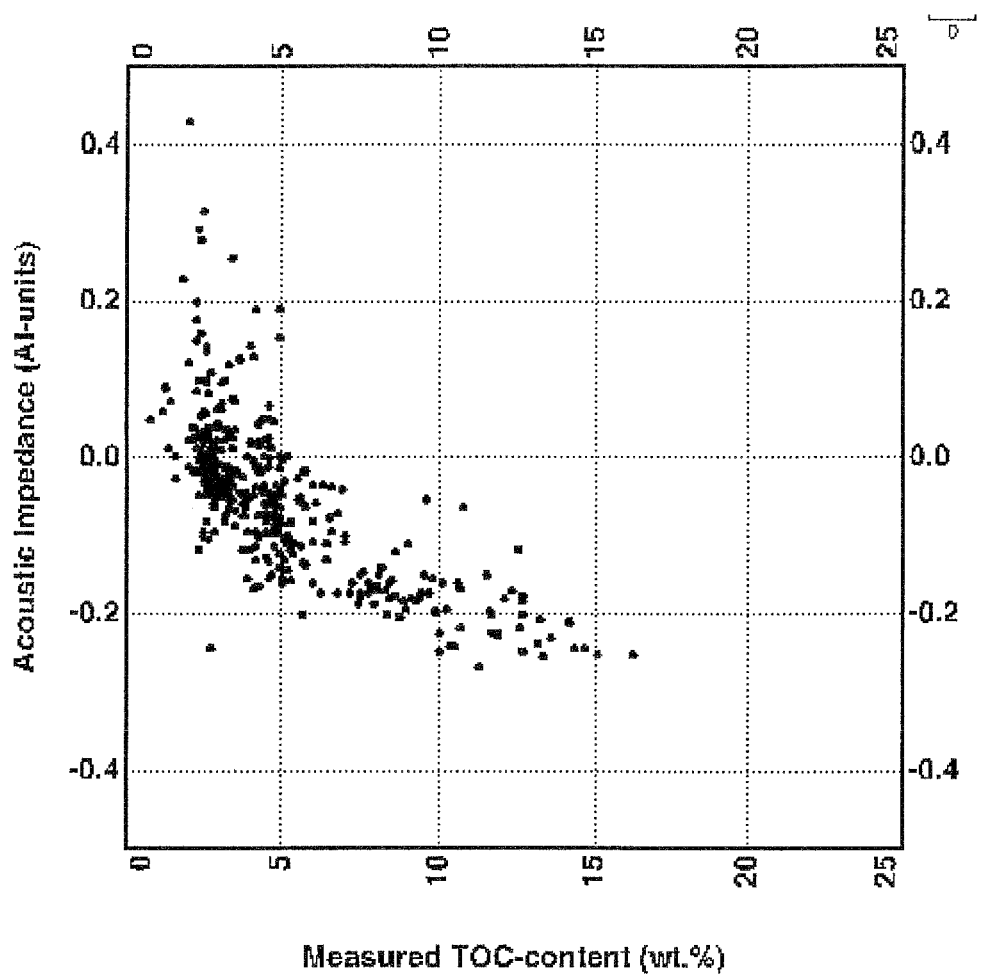
FIG. 2 is a graph illustrating the relationship between acoustic impedance and measured total organic carbon content.

This information may then be used to determine the relationship between acoustic impedance (velocity×density) and organic content from well data. For example, acoustic impedance may be plotted against TOC content (in percentage concentration by weight) as shown in FIG. 2 to allow an equation or expression to be determined expressing a relationship between TOC content and acoustic impedance. This information may then be used in subsequent steps of the process for assessing the richness of the candidate source rock.

In order to make use of the seismic data relating to the region, the seismic data available for the region have to be assessed and, if necessary, conditioned in various ways, for example as disclosed in Sheriff, 1998. For example, well ties may be performed in order to control data quality. Agreement between the seismic responses in the "real" seismic data and in the "synthetic" seismic data (derived as described hereinbefore) indicate that the quality of the seismic data and the quality of the well logs are good and that the two types of data give a good image of the subsurface.

It is also necessary to check the phase and polarity of the real seismic data. In particular, it is necessary to be able to distinguish how increasing and decreasing acoustic impedances at reflective boundaries between layers are imaged on the seismic data.

In many conventional uses of seismic data, the amplitudes of the data are scaled or clipped because the amplitude information is not required. However, in the present process, it is necessary to use seismic data whose amplitude has not been scaled or clipped as the source rocks appear as extreme amplitudes on the seismic data. Thus, extreme amplitudes should not have been removed from the data.

It is further necessary to check the time alignment of sub-stacks (stacks of some but not all of the seismic traces). In particular, as described hereinafter, when evaluating the AVO behaviour of the data, the gathers should be "flat" in that reflections from the same reflectors should be time-aligned with each other. If this is not the case, then the gathers should be "flattened" so as to achieve this.

Amplitude scaling is also checked and adjusted if necessary. Changes in amplitude with offset should be similar in real seismic data and in synthetic seismic data if they are to be trusted. AVO behaviour in real seismic data are therefore compared with the synthetic AVO behaviour in non-source shale rock intervals. If the behaviours are not sufficiently similar, the far stack should be scaled so that there is accordance between the real and synthetic seismic data.

The real seismic data are then used so as to identify the boundaries of candidate source rocks in the region of interest. FIG. 3 illustrates a typical response from the top of a source rock where a negative amplitude reflection becomes less negative or "dims" with offset or angle. Thus, layers whose upper boundaries provide a strong negative amplitude reflection, which amplitude becomes weaker or dims with offset are selected as strong candidates for source rock. Such a characteristic is known as an AVO Class 4 response. This is characteristic of the reduction in acoustic impedance at the top of the source rock as illustrated in FIG. 1a.

Alternatively, or additionally, the lower boundary or base of candidate source rock may be identified where there is a large increase in acoustic impedance at the base of the source rock as illustrated in FIG. 1b. This results in an AVO Class 1 response as illustrated in FIG. 4, where the strong positive amplitude reflection becomes weaker with offset.

Figure 5A:
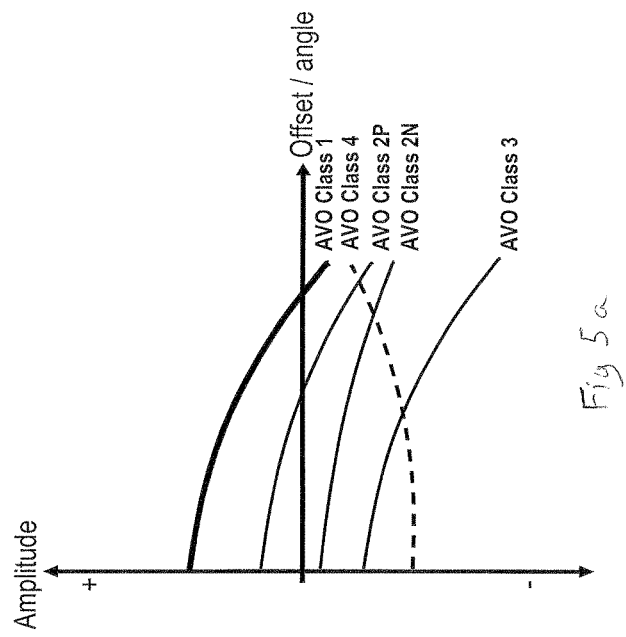
FIGS. 5a and 5b illustrate AVO responses as amplitude against offset or angle and near stack minus far stack against near stack.
Figure 5B:
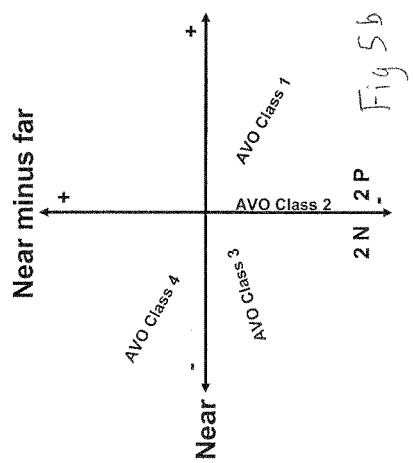

The AVO behaviour of the candidate source rock horizons may be verified as illustrated in FIG. 5a and FIG. 5b. FIG. 5a illustrates the various AVO classes defined by Rutherford and Williams 1989. AVO Class 1 is characterised by strong positive amplitude on near stack becoming less positive with offset. AVO Class 2 P is characterised by weak positive amplitude becoming negative with offset (phase reversal). AVO Class 2 N is characterised by weak negative amplitude becoming more negative with offset (brightening). AVO Class 3 is characterised by strong negative amplitude on near stack becoming more negative with offset. AVO Class 4 is characterised by strong negative amplitude on near stack becoming less negative with offset.

In order to verify the AVO behaviour, a "far minus near" stack is generated and cross-plotted against near stack values. The resulting values are then checked to determine in which part of the plane shown in FIG. 5b they plot and, in particular, whether these values are in the appropriate AVO class regions or quadrants.

In order to clarify the data, the seismic traces or stacks are amended so as to remove data which are not relevant to the assessment of the candidate source rock. Thus, where AVO Class 4 responses have been identified corresponding to the tops of candidate source rocks, all other seismic responses are set to zero. This may be performed by excluding near amplitude higher than zero, calculating the product of near stacks with near-minus far stacks, and excluding amplitudes higher than zero. In the case of AVO Class 1 responses, the volume highlights only seismic responses typical for the base of candidate source rocks and sets all other seismic responses to zero. In particular, this excludes near amplitudes lower than zero, calculates near stack multiplied by far minus near stack, and excludes amplitudes higher than zero.

The resulting data are thus clarified so as to relate only to the responses which are typical of source rock upper and lower boundaries. The top and base of the candidate source rock are then identified and "picked" on the seismic data. A series of apparently related reflections on several seismograms is often referred to as a "reflection event". By correlating reflection events, a seismologist can create an estimated cross-section of the geological structure that generated the reflections. Standard seismic interpretation tools may be used, such as those known as Seisworks and Petrel. Examples of these techniques are disclosed in Sheriff and Geldart, 2006. To identify the top of candidate source rock, picking is performed on near stack seismic or on AVO Class 4 volume where the tops of source rocks are most prominent. For the base of the source rock, picking is performed on near stack seismic or on AVO Class 1 volume where the bases of the source rocks are most prominent.

Once the top and bottom boundaries of the candidate source rock have been identified in this way, the depth of the source rock is determined from the seismic data (Sheriff and Geldart, 2006). Depth conversion converts the acoustic wave travel time to actual depth based on the acoustic velocity of the subsurface. Stacking velocities and/or velocity logs are used to calculate the depths from the time-domain seismic data whereby the depth is equal to velocity multiplied by time. This calculation is performed for the top and base horizons of the candidate source rock and the thickness of the candidate source rock is then generated as the difference between the depth to the base horizon and the depth to the top horizon. Thickness is plotted as a map of the region being assessed to give the extent and thickness of the source rock. These parameter are then input to a basin modelling procedure.

The well known technique of seismic inversion is then performed so as to transform the seismic reflection data into a quantitive rock property description of a rock section. Inversion typically gives spatial (particularly vertical) variations of the acoustic impedance for the seismic trace of the seismic data. Such inversion may be performed using standard software, such as that known as Jason, Hampson Russel or Osiris.

Amplitude maps are then generated from acoustic impedance volume in the source rock interval, for example, as disclosed in Sheriff and Geldart, 2006. The maps show lateral variation in acoustic impedance at the top and base of the source rock or the average of the interval between the top and base of the candidate source rock. Standard attribute generation software may be used to extract the amplitudes at picked top and base source rock horizons and examples of such software are known as Landmarks PostStacks/Pal and Geoprobe or Petrel. Thus, for each location of the horizontal map of the candidate source rock, the vertical profile of the acoustic impedance within the source rock is established. The function derived from a plot like FIG. 2 is then used to convert this to total organic carbon volume so as to establish the organic content in the candidate source rock. The total organic carbon volume can thus be calculated for the whole of the source rock within the region being assessed to give a value for the richness for the source rock, which is a parameter also used in basin modelling.

The present technique may thus be used to assess a hydrocarbon source rock candidate. The seismic data relating to the region being assessed are analysed to determine the presence, thickness and lateral extent of the candidate source rock based on knowledge of the seismic behaviour of hydrocarbon source rocks. An estimate of the organic content of the candidate source rock is provided from acoustic impedance. An estimate of the hydrocarbon generation potential of the candidate source rock may then be provided from the thickness and lateral extent of the candidate source rock and from the estimate of the organic content.

Shale gas rock has been determined to be more similar to a source rock than to a reservoir rock in terms of its seismic behaviour. In other words, it has been found that the reflection at the top of a shale gas rock has a characteristic AVO Class 4 behaviour as one would search for when identifying a source rock. Traditional reservoir rock or inorganic shale would not have the same combination of low acoustic impedance, AVO Class 4 response at the top and widespread extent. In FIG. 5b an inorganic shale will fall along a NW-SE oriented trend going through origin while an organic rich shale will fall south of this trend, closer to the x-axis of the plot. A sandstone will normally not have as great extent as a shale and can by that be distinguished from an organic rich shale despite having similar AVO response.

For shale gas, the source rock will not be spaced apart from the reservoir due to the very low permeability of shale, i.e. the source rock and the reservoir rock are essentially the same. This means that the interval that will be analysed in the same manner as analysing the hydrocarbon source rock by seismic data is in fact the reservoir. Therefore the technique disclosed herein applies to shale gas applications, for example for quantifying the natural gas content in a shale gas reservoir.

The organic content referred to above may of course comprise an amount of hydrocarbon (such as natural gas). In this respect, the hydrocarbon (e.g. natural gas) is trapped or contained in or held by the candidate source rock, and is considered as part of the organic content of the candidate source rock. The above-described step of providing an estimate of the hydrocarbon generation potential of the candidate source rock may comprise providing an estimate of the amount and/or distribution, or at least an indication of the presence, of hydrocarbon (e.g. natural gas) contained in or held by the candidate source rock.

A method as described herein for determining the presence of a candidate source rock is based on the realisation that a source rock (including the special type of source rock, shale gas rock) has the following unique characteristics: (a) the top reflection of the rock has an AVO Class 4 seismic response, where a layer with lower acoustic impedance results in a strong negative amplitude at the top and a strong positive amplitude at the base, including a decreasing amplitude with increasing offset; and (b) significant lateral extent.

Increasing the content of organic material (oil, gas and other organic content) results in an even lower acoustic impedance. Shale gas rock is considered more as a source rock rather than a reservoir rock since its characteristic seismic behaviour is very similar to the traditional source rocks.

When entering a new area with potential shale (or oil) gas, one would typically start with a screening phase, i.e. shooting seismic over an area, searching for rocks with AVO Class 4 response over a large area. After having identified such a rock, one might start evaluating the amount of hydrocarbon contained in the rock, i.e. evaluation of thickness, lateral extent and richness.

Therefore an embodiment of the present invention proposes a method of identifying a source rock candidate, comprising the steps of: providing seismic data for a region of the Earth; analysing the data to determine the presence of a candidate source rock by locating a region of rock where the seismic data for that region indicates a significantly lower acoustic impedance (for example in the region of 10 to 20% lower, or more than 20% lower in some cases) compared or relative to one or both of the over- and underlying rocks and where the seismic amplitude decreases with increasing offset, such as an AVO Class 4 seismic response at the top and/or an AVO Class 1 seismic response at the base. The source rock may be a shale gas or a shale oil reservoir. The seismic response at the top of the source rock may be of AVO Class 4 over a large area extending laterally, for example tens of thousands of square kilometers (one might have AVO Class 4 without having a shale gas rock, but over a smaller area and with a different distribution than for shale). The seismic response at the base of the source rock may be of AVO Class 1 over a large area extending laterally, for example tens of thousands of square kilometers. The method may comprise making an assessment of the lateral extent, thickness and richness of the candidate source rock. The method may comprise providing an estimate of the amount and/or distribution, or at least an indication of the presence, of shale gas contained in or held by the candidate source rock from acoustic impedance information derived from the seismic data. A low range of acoustic impedances may indicate the presence of shale gas.

If the circumstances are such that the full work flow strategy cannot be employed, then it may be simplified in order to provide a fast-track work flow strategy. The fast-track work flow requires full-stack or offset seismic data from the area of interest, preferably with well data from the area, such as log data or organic geochemical data relating to TOC content.

The seismic data are prepared by performing well ties, verifying phase, investigating scaling and clipping, checking and adjusting amplitude of sub-stacks (if available), checking and adjusting time alignment of sub-stacks (if available). Well log analysis is performed to determine expected top and base source rock responses on seismic data. Density and compressional velocity logs are analysed to generate synthetic logs or gathers for well ties, as described hereinbefore. Similarly, TOC profile analysis on well data, without TOC data or without well data, are performed as described hereinbefore. Detailed interpretation of the data is then performed by identifying and picking top and/or base source rock responses in the seismic data, cross-plotting near and far stacks to verify AVO behaviour (if sub-stacks are available) and generating amplitude maps on top and/or base source rock reflections as described hereinbefore.

REFERENCES

Castagna, J. P.; Swan, H. W.; Foster, D. J., 1998: Framework for AVO gradient and intercept interpretation. Geophysics, Volume: 63, Number: 3, Page: 948-956.

Rider, M., 1996: The Geological Interpretation of Well Logs. Whittles Publishing. Second edition. 280 pp.

Rutherford, S. and Williams, R. H., 1989: Amplitude-versus-offset variations in gas sands. Geophysics, Volume: 54, Number: 6, Page: 680-688.

Sheriff, R. E. and Geldart, L. P., 2006: Exploration seismology. Cambridge University Press 1982, 1995. Second edition.

Sheriff, R. E., 1988: Encyclopedic Dictionary of Exploration Geophysics. Society of Exploration Geophysisists. Published 1984, reprinted 1988.

Weiss, H. M, Wilhelms, A., Mills, N., Scotchmer, J., Hall, P. B., Lind, K and Brekke, T., 2000: NIGOGA—The Norwegian Industry Guide to Organic geochemical Analyses [online]. Edition 4.0. Published by Norsk Hydro, Statoil, Geolab Nor, SINTEF Petroleum Research and the Norwegian Petroleum Directorate. 102 pp. Available from World Wide Web: http://www.npd.no/engelsk/nigoga/default.htm

The invention claimed is:

1. A method of identifying a source rock candidate in a region of the Earth suspected to contain source rock and drilling, comprising the steps of:
   detecting, from beneath the surface of the Earth, a negative amplitude reflection of seismic energy followed by detecting a less negative amplitude reflection with increasing offset;
   detecting, from further beneath the surface of the Earth than the detected negative amplitude reflection, a positive amplitude reflection of seismic energy followed by detecting a weaker positive amplitude reflection with increasing offset;
   identifying a candidate source rock candidate via the detected negative and positive amplitude reflections;
   performing basin modelling based on seismic characteristics of the identified candidate source rock; and
   drilling a well on the basis of a basin model generated based on seismic characteristics of the identified candidate source rock.

2. A method as claimed in claim 1, wherein the detecting negative amplitude reflection step comprises locating an interval having an AVO Class 4 seismic response.

3. A method as claimed in claim 1, wherein the detecting positive amplitude reflection step comprises locating an interval having an AVO Class 1 seismic response.

4. A method as claimed in claim 1, wherein the source rock is or comprises a shale gas or a shale oil reservoir.

5. A method as claimed in claim 1, wherein the detecting negative amplitude reflection step comprises locating an interval having an AVO Class 4 over a large area extending laterally.

6. A method as claimed in claim 1, wherein the detecting positive amplitude reflection step comprises locating an interval having an AVO Class 1 over a large area extending laterally.

7. A method as claimed in claim 1, comprising making an assessment of the lateral extent, thickness and richness of the candidate source rock.

8. A method as claimed in claim 1, comprising providing an estimate of the amount and/or distribution, or at least an indication of the presence, of hydrocarbon contained in or held by the candidate source rock from the detected negative amplitude reflection and positive amplitude reflection.

9. A method as claimed in claim 8, comprising providing an estimate of the amount and/or distribution, or at least an indication of the presence, of natural gas such as shale gas contained in or held by the candidate source rock from the detected negative amplitude reflection and positive amplitude reflection.

10. An apparatus comprising means for performing a method as claimed in claim 1.

11. A method of identifying a source rock candidate in a region of the Earth and drilling, comprising the steps of:
   providing seismic data for the region of the Earth;
   identifying the presence of the candidate source rock by locating a region of rock where the seismic data indicates a low acoustic impedance relative to an over and/or underlying region of rock and where the seismic amplitude decreases with increasing offset;
   performing basin modelling based on seismic characteristics of the identified candidate source rock; and
   drilling a well on the basis of a basin model generated based on seismic characteristics of the identified candidate source rock.

12. A method of identifying a source rock candidate in a region of the Earth and drilling, comprising the steps of:
   providing seismic data for the region of the Earth;
   identifying the presence of the candidate source rock from an upper boundary having a fall in acoustic impedance greater than a first threshold value and having an Amplitude Versus Offset Class 4 response, and/or from a lower boundary having a rise in acoustic impedance greater than a second threshold value and having an Amplitude Versus Offset Class 1 response;
   performing basin modelling based on seismic characteristics of the identified candidate source rock; and
   drilling a well on the basis of a basin model generated based on seismic characteristics of the identified candidate source rock.

* * * * *